Oct. 3, 1933.   A. G. COREY   1,929,238
TRACTION AND ANTISKID CHAIN
Filed June 9, 1932
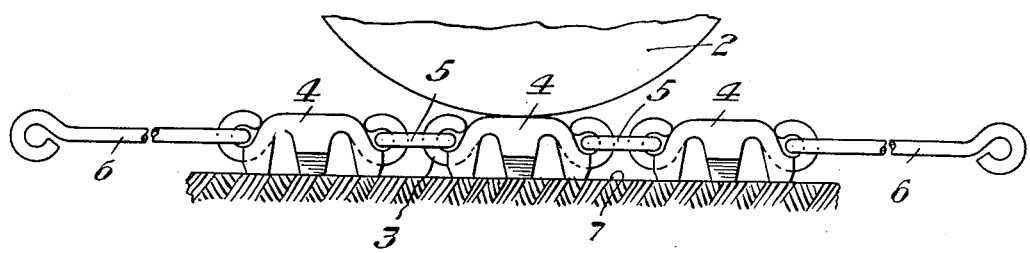
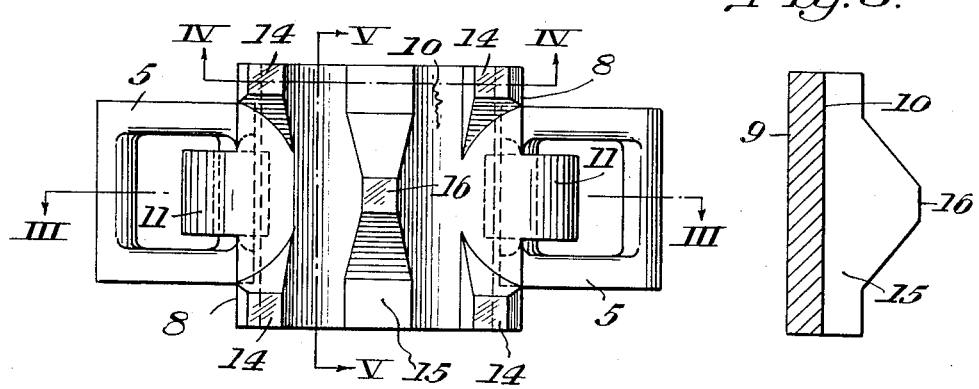
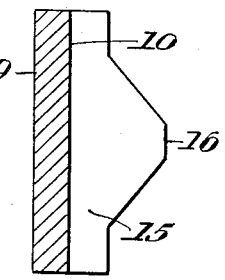
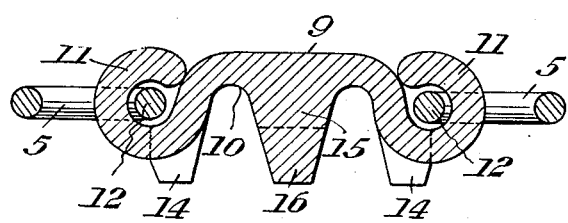
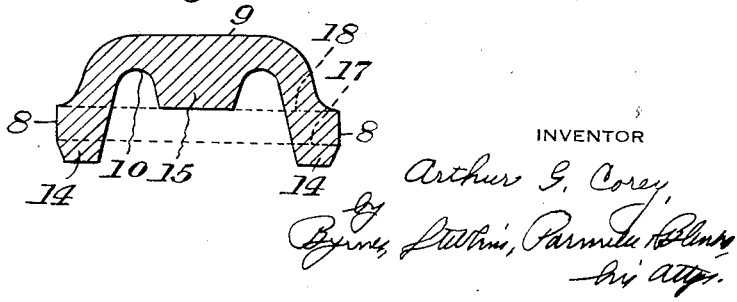
INVENTOR
Arthur G. Corey, Patented Oct. 3, 1933

1,929,238

UNITED STATES PATENT OFFICE 1,929,238

TRACTION AND ANTISKID CHAIN

Arthur G. Corey, McKeesport, Pa.

Application June 9, 1932. Serial No. 616,196

6 Claims. (Cl. 152—14)

The present invention relates broadly to the art of traction devices for vehicle wheels, and more particularly to a traction device in the form of a chain adapted to be utilized with motor vehicle tires.

It is customary in the art to which my invention relates to provide traction chains of two distinctive types. The first of these comprises inter-engaging links of generally circular cross section and detachably secured at their ends to annular retaining bands or chains. The second type comprises articulated links in which certain of the links are in the form of plates having traction improving and skid resisting characteristics.

The first type of devices, while effective for the purposes intended during their life, are inherently of such construction as to provide a wear resisting portion of comparatively small cross sectional area which, in any case, is only effective for increasing traction and preventing skidding in a general forward or rearward direction and not in a side direction.

In the devices coming within the second type, and including usually stud bearing plates articulated one to the other through the medium of links or pins, the plates have been designed primarily from the standpoint of the tire shape or contour and not from the standpoint of maximum life, strength, traction and skid-resisting properties. For this reason, such plates while usually of arched or generally curved construction from one end thereof to the other, have had the curvature of such nature that the concave side of the plate would be adjacent the tire and the convex surface would be disposed outwardly.

The present invention relates generally to devices of the second type, and has for one of its objects the provision of a link or plate for tire chains comprising a body portion providing a concave outer surface, and having a plurality of road engaging studs on the concave side of such surface.

Another object of the present invention is to provide a link or plate of the character referred to with the studs so arranged thereon that after certain of the studs have become worn to such an extent as to substantially obviate any further utility from the standpoint of improved traction or resistance to skidding, the plate or link itself will effectively serve in such capacity.

A still further object of the present invention is to provide a link or plate for tire chains of such nature that so long as the plate retains sufficient body to give the necessary structural strength for use on a vehicle wheel, at least one of the studs on the road surface thereof will be effective in all directions for both traction and skid-resisting purposes.

In the accompanying drawing I have shown for purposes of illustration only, a preferred embodiment of the present invention. In the drawing—

Figure 1 is a view in side elevation of a tire chain embodying my invention, a portion of a vehicle tire being illustrated schematically in partial engagement therewith;

Figure 2 is a bottom plan view, on an enlarged scale, of one of the links shown in Figure 1 together with the means by which it is operatively associated with adjacent similar links;

Figure 3 is a longitudinal sectional view along the line III—III of Figure 2;

Figure 4 is a detail sectional view along the line IV—IV of Figure 2, looking in the direction of the arrows; and Figure 5 is a detail sectional view along the line V—V of Figure 2, looking in the direction of the arrows.

Referring more particularly to Figure 1 of the drawing, there is indicated a portion of a pneumatic tire 2 with which is adapted to cooperate a transversely extending tire chain 3 constructed in accordance with the present invention. This tire chain is herein illustrated as comprising three traction links 4 of generally similar characteristics articulated one to the other by means of intermediate links 5, and adapted to be joined to side bands or chains extending generally circumferentially of the tire 2, but not shown, by means of connectors 6 of any desired construction. The present invention does not contemplate any particular novelty with respect to construction either of the intermediate links 5 or the connectors 6, although certain advantages will hereinafter be pointed out with respect to their general location with respect both to the tire 2 and to a road surface 7.

By reference more particularly to Figure 2 of the drawing, it will be apparent that each of the traction links 4 comprises a body portion which is of generally rectangular outline, while by reference to Figures 3 and 4 it will be apparent that such intermediate body portion is of generally arched construction from one side edge 8 to the opposite side edge 8 thereof. It will further be apparent that the direction of curvature is such that the generally convex surface 9 of each of the traction links is adapted to contact the tire 2, while the generally concave side 10 is adapted to be disposed outwardly toward the road surface. Projecting outwardly from each of the sides 8 is a tongue 11 which is adapted to be bent into substantially the shape shown in Figure 3 around one of the cross pieces 12 of the intermediate articulating links 5. By properly choosing the material of which the traction links are formed, it is possible to effect renewal thereof at will by opening the tongues 11 and substituting a new link in place of a worn one.

Disposed adjacent each of the corners of the body portion of each of the traction links 4, on the outer concave side thereof is a corner stud 14, these corner studs all being of generally similar characteristics and conveniently of gradually decreasing cross section from the body of the plate outwardly, although such a tapered construction is not essential. Where provided, it affords a gradually increasing road engaging area as the traction links become worn.

Extending transversely of each of the traction links 4 along substantially the median line thereof is a reinforcing rib 15 which, as apparent from Figures 3 and 4, is of gradually decreasing cross section outwardly from the body of the link. Carried substantially centrally by the rib 15 is a center traction stud 16 having characteristics similar to the characteristics of the corner studs 14.

The generally arched construction before referred to possesses several advantages. In the first place, it provides generally smooth surfaces 9 of appreciable area in engagement with a tire, whereby injury to the tire is minimized. In the second place, it insures an extremely rigid construction which will effectively resist the compressive forces to which the link is subjected in use. In the third place, it enables the use of a center stud 16 of maximum length and therefore capable of penetrating to a maximum distance into a relatively soft road surface in such manner that sufficient traction is insured. The principal advantage, however, will become more fully apparent from a consideration of Figure 4 of the drawing. In this figure, I have indicated substantially parallelly extending dotted lines 17 and 18. The dotted line 17 indicates generally the plane of the outer corners of the sides 8, and from a consideration of Figure 4 it will be apparent that when all of the studs have become worn so that their outer surfaces lie substantially in the plane of the line 17, the corner edges of the sides 8 will be effective for resisting any lateral skidding tendency. At this time, the center stud 16 will have a projection substantially equal to the distance between the dotted lines 17 and 18. Inasmuch as all sides of this center stud are freely exposed, it will be effective for giving traction and preventing skidding, in substantially every direction. It thus becomes apparent that the wearing away of the freely projecting portions of the corner studs does not destroy the utility of the traction links.

After a traction link has become worn to the extent indicated by the dotted line 17, it may be continued in service for an appreciable time thereafter. During such time, however, the edge portions of the main body of the traction link will be subjected to wear until such time as the entire body of the link is worn to substantially the position indicated by the dotted line 18. At this time, the tongues 11 will have been worn substantially through, thereby necessitating removal of the link and the substitution of a new link. It will be understood, however, that the intermediate links 5 are positioned above the dotted line 18 in such manner that at no time are they subjected to any appreciable wear by reason of engagement with the road surface 7. They may therefore be continued in service for considerable periods of time without fear of breakage. It will also be apparent from Figures 1 and 3 of the drawing that the intermediate links 5 are likewise spaced from the tread of the tire 2 in such manner that they do not subject the tire to undue wear due to their flexing movements as required to accommodate the movement of the traction links when subjected to different road conditions. Additional strength is afforded to the arched traction links by reason of the centrally located intermediate rib 15. While in some cases, as where the body of the traction links is sufficiently heavy, I may obviate such an intermediate rib, I have found that its presence gives generally desirable results from the standpoint of strength.

Where the traction links are arched in the opposite direction, it is not possible to utilize studs having as great a length as permitted by my construction before described, nor is it possible to provide a link in which the ends of adjacent links will serve to prevent skidding when the studs have become appreciably worn.

The advantages of the present invention will be apparent from the foregoing description. Among these advantages, however, may be mentioned the minimizing of wear on the tire due to the generally smooth convex surfaces presented by the traction links to the tire; the greater strength of the traction links by reason of the arched construction; the greater length of life by reason of the use of traction links of generally arched characteristics in which the concave surface is disposed toward the road, and the effectiveness of the edge portions of the plates themselves as skid-resisting members when the studs have become appreciably worn.

While I have shown in the drawing a preferred embodiment of the invention only, it will be apparent from both the specification and drawing that changes in the construction herein described and illustrated may be made without departing either from the spirit of the invention or the scope of my broader claims.

I claim:

1. As an article of manufacture, a link for tire chains comprising an arched intermediate portion having the ends of said arched portion recurved, affording connections for adjacent links, said intermediate portion being arched away from engagement with the road whereby the recurved ends receive the brunt of the wear and limit the effective life of the link by parting with the adjacent link, and a plurality of road-engaging studs on the side of the link facing the road.

2. As an article of manufacture, a link for tire chains comprising an arched intermediate portion having the ends of said arched portion extended as tongues bent back to constitute of themselves connections for adjacent links, said intermediate portion being arched away from engagement with the road, and a plurality of road-engaging studs on the side of the link facing the road.

3. As an article of manufacture, a link for tire chains comprising an arched intermediate portion having the ends of said arched portion recurved, affording connections for adjacent links, said intermediate portion being arched away from engagement with the road whereby a quadrilateral generally concave surface is turned toward the road, and a plurality of road-engaging studs projecting outwardly from substantially the center and corner portions of said surface.

4. A cross chain for vehicle tires comprising a plurality of traction links and intermediate articulating links, each of said traction links comprising an arched intermediate portion having the ends of said arched portion recurved as couplings for the adjacent articulating links, said intermediate portions being arched away from engagement with the road, and a plurality of road-engaging studs on the sides of the links facing the road.

5. A cross chain for vehicle tires comprising a plurality of traction links and intermediate articulating links, each of said traction links comprising an arched intermediate portion having the ends of said arched portion extended as tongues surrounding adjacent portions of the adjacent articulating links, said intermediate portions being arched away from engagement with the road, and a plurality of road-engaging studs on the sides of the links facing the road.

6. A cross chain for vehicle tires comprising a plurality of traction links and intermediate articulating links, each of said traction links comprising an arched intermediate portion, said intermediate portion being arched away from engagement with the road, and recurved end portions constituting hooks for connection to the adjacent articulating links, and a plurality of road-engaging studs projecting outwardly from substantially the center and end portions of said arched portions of the traction links.

ARTHUR G. COREY.